(12) United States Patent
Marcotte et al.

(10) Patent No.: US 8,844,519 B2
(45) Date of Patent: Sep. 30, 2014

(54) TORQUE TRANSFER BETWEEN TROUGH COLLECTOR MODULES

(71) Applicant: Abengoa Solar Inc., Lakewood, CO (US)

(72) Inventors: Patrick Marcotte, Lakewood, CO (US); Kenneth Biggio, Lakewood, CO (US); Edmund Kenneth May, Lakewood, CO (US)

(73) Assignee: Abengoa Solar LLC, Lakewood, CO (US)

( * ) Notice: Subject to any disclaimer, the term of this patent is extended or adjusted under 35 U.S.C. 154(b) by 0 days.

(21) Appl. No.: 13/682,472

(22) Filed: Nov. 20, 2012

(65) Prior Publication Data

US 2013/0074831 A1 Mar. 28, 2013

Related U.S. Application Data

(62) Division of application No. 12/416,536, filed on Apr. 1, 2009, now Pat. No. 8,322,333.

(51) Int. Cl.
| | |
|---|---|
| *F24J 2/10* | (2006.01) |
| *F24J 2/46* | (2006.01) |
| *F24J 2/14* | (2006.01) |
| *F24J 2/54* | (2006.01) |

(52) U.S. Cl.
CPC ........ *F24J 2/5403* (2013.01); *F24J 2002/5468* (2013.01); *F24J 2/4636* (2013.01); *F24J 2/4638* (2013.01); *F24J 2/14* (2013.01); *Y02E 10/47* (2013.01); *F24J 2/541* (2013.01); *F24J 2002/5441* (2013.01); *Y02E 10/45* (2013.01); *F24J 2/10* (2013.01)
USPC ........... 126/696; 126/684; 126/685; 126/692; 126/694; 403/28; 403/221; 403/356

(58) Field of Classification Search
USPC ................................................. 126/692, 696
See application file for complete search history.

(56) References Cited

U.S. PATENT DOCUMENTS

| 1,854,420 A | * | 4/1932 | Norton .......................... 405/123 |
| 2,030,262 A | * | 2/1936 | Maddock ........................ 14/73.1 |

(Continued)

FOREIGN PATENT DOCUMENTS

| EP | 1 903 155 A1 | 3/2008 |
| ES | 2 294 903 A1 | 4/2008 |

(Continued)

OTHER PUBLICATIONS

Ariel Hanaor, Special Issue on "Prefabricated Spatial Frame Systems", International Journal of Space Structures, vol. 10 No. 3, 1995; Multi-Science Publishing Co., Ltd., Essex, England.

(Continued)

*Primary Examiner* — Jorge Pereiro
(74) *Attorney, Agent, or Firm* — Kilpatrick Townsend & Stockton LLP

(57) ABSTRACT

A system for transferring torque between modules in a concentrating solar collector array. A trough collector system includes at least two modules, each module including a reflector having a reflective surface shaped to concentrate incoming radiation onto a linear tube, and a structural lattice attached to the reflector. The modules are constrained to rotate about a common axis. A torque transfer connection directly connects the three-dimensional structural lattices of the two modules at a location removed from the axis of rotation. Torque is thus transmitted between the modules by a force couple acting on the module. Also described are a method of transferring torque between adjacent trough collector modules, and a three-dimensional structural lattice configured for use in the system and method. Mechanisms for accommodating thermal expansion and contraction of the array are described. A drive system is described that imparts torque to a module near an edge of the module.

13 Claims, 12 Drawing Sheets

(56) References Cited

U.S. PATENT DOCUMENTS

| | | | | |
|---|---|---|---|---|
| 2,171,326 | A | * | 8/1939 | Tarbet .................... 14/73.1 |
| 3,369,536 | A | * | 2/1968 | Fannon, Jr. et al. ......... 126/92 B |
| 3,635,425 | A | | 1/1972 | Swet |
| 4,005,629 | A | | 2/1977 | Franklin |
| 4,021,267 | A | | 5/1977 | Dettling |
| 4,038,972 | A | * | 8/1977 | Orrison .................... 126/578 |
| 4,122,646 | A | | 10/1978 | Sapp |
| 4,178,913 | A | * | 12/1979 | Hutchison ................. 126/601 |
| 4,198,953 | A | | 4/1980 | Power |
| 4,211,044 | A | | 7/1980 | Gugliotta et al. |
| 4,249,514 | A | * | 2/1981 | Jones ...................... 126/605 |
| 4,264,145 | A | * | 4/1981 | Urruela .................... 359/846 |
| 4,326,773 | A | | 4/1982 | Colas |
| 4,379,649 | A | | 4/1983 | Phillips et al. |
| 4,386,600 | A | * | 6/1983 | Eggert, Jr. ................. 359/852 |
| 4,422,614 | A | | 12/1983 | Santos |
| 4,432,661 | A | | 2/1984 | Phillips et al. |
| 4,449,843 | A | | 5/1984 | Wendel |
| 4,460,286 | A | | 7/1984 | Schaff |
| 4,508,426 | A | | 4/1985 | Hutchison |
| 4,523,518 | A | * | 6/1985 | Gartner .................... 454/186 |
| 4,687,880 | A | | 8/1987 | Morris |
| 4,745,412 | A | | 5/1988 | Creaser, Jr. |
| 4,829,739 | A | | 5/1989 | Coppa |
| 4,904,108 | A | | 2/1990 | Wendel |
| 5,013,176 | A | * | 5/1991 | Orbom ..................... 403/171 |
| 5,058,565 | A | | 10/1991 | Gee et al. |
| 5,127,759 | A | * | 7/1992 | Orbom ..................... 403/171 |
| 5,224,320 | A | | 7/1993 | Mai |
| 5,322,053 | A | * | 6/1994 | Leicht ..................... 126/681 |
| 5,553,342 | A | * | 9/1996 | Townsend ................. 14/13 |
| 5,956,917 | A | | 9/1999 | Reynolds |
| 5,964,216 | A | * | 10/1999 | Hoffschmidt et al. ........ 126/696 |
| 6,050,526 | A | | 4/2000 | Stribling, Jr. |
| 6,164,786 | A | | 12/2000 | Lloyd |
| 6,498,290 | B1 | | 12/2002 | Lawheed |
| 6,691,701 | B1 | | 2/2004 | Roth |
| 6,814,184 | B1 | | 11/2004 | Blinn, Jr. |
| 6,886,339 | B2 | * | 5/2005 | Carroll et al. .............. 60/641.8 |
| 7,530,201 | B2 | | 5/2009 | Reynolds et al. |
| 7,709,730 | B2 | * | 5/2010 | Johnson et al. ............. 136/246 |
| 7,932,461 | B2 | * | 4/2011 | Johnson et al. ............. 136/246 |
| 7,968,791 | B2 | | 6/2011 | Do et al. |
| 2002/0179138 | A1 | | 12/2002 | Lawheed |
| 2003/0051750 | A1 | | 3/2003 | Lawheed |
| 2003/0201008 | A1 | | 10/2003 | Lawheed |
| 2004/0045596 | A1 | | 3/2004 | Lawheed |
| 2004/0216734 | A1 | | 11/2004 | Lawheed |
| 2007/0011983 | A1 | | 1/2007 | Reynolds et al. |
| 2008/0072516 | A1 | | 3/2008 | Reynolds et al. |
| 2008/0127595 | A1 | | 6/2008 | Reynolds et al. |
| 2008/0204352 | A1 | | 8/2008 | Reynolds et al. |
| 2008/0236567 | A1 | | 10/2008 | Hayden |
| 2009/0095283 | A1 | * | 4/2009 | Curtis et al. ............... 126/704 |
| 2009/0101195 | A1 | | 4/2009 | Reynolds et al. |
| 2009/0194657 | A1 | | 8/2009 | Vazquez et al. |
| 2010/0043776 | A1 | * | 2/2010 | Gee ........................ 126/571 |
| 2010/0051021 | A1 | | 3/2010 | Kunz |
| 2010/0213704 | A1 | | 8/2010 | Burger et al. |
| 2010/0229851 | A1 | * | 9/2010 | Reynolds .................. 126/605 |
| 2011/0023940 | A1 | | 2/2011 | Do et al. |
| 2011/0073104 | A1 | | 3/2011 | Dopp et al. |
| 2011/0157733 | A1 | * | 6/2011 | Werner et al. .............. 359/871 |

FOREIGN PATENT DOCUMENTS

| | | |
|---|---|---|
| FR | 2 917 237 A1 | 12/2008 |
| WO | 02/097341 A1 | 12/2002 |
| WO | 2004/083741 A2 | 9/2004 |
| WO | 2007/129146 A1 | 11/2007 |
| WO | 2010/105111 A1 | 9/2010 |

OTHER PUBLICATIONS

International Search Report and Written Opinion of PCT/US2010/029481 mailed on Jun. 15, 2011, 20 pages.

* cited by examiner

TORQUE TRANSFER BETWEEN TROUGH COLLECTOR MODULES

This application is a Divisional of and claims priority to U.S. Pat. No. 8,322,333, issued Dec. 4, 2012, entitled "TORQUE TRANSFER BETWEEN TROUGH COLLECTOR MODULES," the disclosure of which is incorporated herein by reference for all purposes.

BACKGROUND

The trough solar collector is a well-known collector technology used for Concentrating Solar Power (CSP) plants. As shown in FIG. 1, such a plant typically employs a large array of sun-tracking, focusing reflectors that concentrate incoming solar radiation onto a tubular conduit that contains a working fluid. The focused radiation heats the working fluid, for example an oil or other fluid. The heated fluid is piped to a central location where its accumulated thermal energy may be utilized in a conventional heat engine, for example to generate steam that drives turbines to produce electric power. In other applications, the heated fluid may be used directly, for example to where the heated fluid is used to heat water for domestic or commercial use. After its thermal energy has been utilized, the fluid may be recirculated through the collector array to be heated again.

The collector arrays may be quite large, covering several square kilometers and including thousands of collector modules, such as the module 101 shown in the simplified diagram of FIG. 1. Several modules are shown in FIG. 1, each of which has a similar construction. The field or array of collectors may be divided into parallel circuits, so that the working fluid need not be circulated through the entire collector field before it is piped to the central location, but instead may be passed through a single row of a few dozen modules during each heating cycle, for example. Many arrangements of circuits are possible. Each module typically includes a parabolic reflector 102 backed by a frame or truss system 103 on the back side of the reflector (away from the sun). The frame adds rigidity to the module. The modules are typically supported on pylons 104 that are located between the modules.

The collector modules are typically grouped into rotatable solar collector assemblies (SCAs) of several modules each, connected in a row. That is, an SCA typically includes several collector modules supported by pylons in a linear arrangement, such that each SCA can rotate about a longitudinal axis. For optimum collection efficiency, all the modules in an SCA preferably rotate in unison to track the sun during the day. Each SCA may be moved by a drive mechanism (not shown) near the center of the SCA, at an end of the SCA, or at another location within the SCA. The collector modules in an SCA are coupled to each other using a central torsion element (shaft) to couple adjacent modules. The components involved in the transfer of torque from one module to the next are sometimes referred to as a "torque transfer assembly". FIG. 2 shows an example of the portion of a torque transfer assembly 200 of one module 101 from its back side. The shaft 201 of the torque transfer assembly 200 is typically located internal to the cross section of the frame 103, near the center of mass of the module. The shaft is typically made of a large-diameter, heavy wall pipe or tubing, and may have a machined outer surface for use with a bearing supporting the module. Attached to the shaft 201 is a heavy plate or truss structure 202 that brings forces from the large frame of one module into the relatively small cross section of the shaft 201, which transmits the torque by essentially pure torsion of the shaft 201. The torque is distributed from the shaft 201 to the frame or truss 202 of the next module via a corresponding plate of the next module (not shown in FIG. 2).

Torque from at least two different sources is transferred between modules via the torque transfer assembly 200. First, a drive mechanism located near the center of the SCA applies torque directly to those modules adjacent to the drive mechanism. For the rest of the modules in the SCA, torque is coupled from one module to the next so that the entire group of modules in the SCA rotates in unison. Second, the module arrays are also subject to wind loading, which may exert very large forces and torques on the array. Wind loading on each module is transmitted to the adjacent module. The resulting torque may be smallest at the end modules of an SCA, but may accumulate through the modules in the SCA row until the drive mechanism must resist the accumulated torsional wind loading of many modules. These torques may be as large as hundreds of thousands of Newton-meters. In order to maintain proper aiming of the array toward the sun, the drive mechanism must be able to resist and overcome the torque resulting from wind loading, and the SCA must be stiff enough that no modules deflect enough from optimum aiming that their energy collection performance is degraded significantly. While the torques are greatest near the drive mechanism, and the modules adjacent the drive mechanism must resist the largest torques, the deflection may accumulate outward from the drive mechanism, and may be greatest at the end of the SCA furthest from the drive mechanism. In order to achieve enough stiffness, the central shaft 201 must be quite large. The torque transfer assembly 200 may require a large amount of material, and may account for 20 percent or more of the structural cost of each module.

Also, the coupling of two optically-precise devices, such as the modules of an SCA, requires that the assembly be fabricated with a relatively high degree of precision for proper energy collection. An additional alignment procedure is usually required as part of the installation process to reduce rotational misalignment between modules.

Another significant issue in the design of an SCA is the accommodation of thermal expansion and contraction. The SCAs are often quite large and may be deployed in environments with significant temperature extremes. For example, an SCA may be 150 meters long, and its length may change as much as 20 centimeters between the temperature extremes that it experiences. Since the SCA is typically anchored in the middle at the drive mechanism, which is not free to move, each end may move as much as 10 centimeters during a temperature cycle. Because of the high shear and torque loads on the torque transfer shafts 201, it is typically cost-prohibitive to employ means such as splined or telescoping shafts to absorb the longitudinal thermal expansion and contraction. Typically, thermal expansion and contraction are accommodated by simply allowing the entire row to expand and contract from the central anchor. This requires over-sizing the length of the torque transfer shafts to provide clearance between each module frame and its supporting structure at both temperature extremes. This further increases the cost of the material used for the shaft, and the increased shaft length further reduces the shaft stiffness, exacerbating the deflection issues described above.

SUMMARY

In one embodiment, a trough collector system comprises first and second modules. The first module comprises a first reflector having a first reflective front surface shaped to concentrate incoming radiation onto a linear tube, and a first three-dimensional structural lattice attached to the first reflector opposite the first reflective front surface. The second module comprises a second reflector having a second reflective front surface shaped to concentrate incoming radiation onto the linear tube, and a second three-dimensional structural lattice attached to the second reflector opposite the second reflective front surface. The first and second modules are constrained to rotate about a common axis of rotation parallel to the linear tube. The collector system further comprises a torque transfer connection directly connecting the first three-dimensional structural lattice to the second three-dimensional structural lattice at a location removed from the axis of rotation. The torque transfer connection is compliant in a direction parallel to the axis of rotation, and is substantially rigid in a direction transverse to the axis of rotation.

Other features and advantages of the present invention should be apparent from the following description of the preferred embodiments, which illustrate, by way of example, the principles of the invention.

DETAILED DESCRIPTION

In general, embodiments of the invention directly connect the structures of two adjacent collector modules. The connection is made at a location removed from the axis of rotation, preferably near the edges of the modules. Torque is then transmitted between the modules by a force couple acting at the rotation axis and at a point removed from the rotation axis, rather than by pure torsion of a shaft coupling the modules. This arrangement has the advantage of reducing the amount of material required to fabricate the assembly while maintaining or improving the torsional stiffness, and therefore the performance, of the assembly. Thermal expansion and contraction are also easily accommodated without excessive oversizing of components.

Figure 3A:
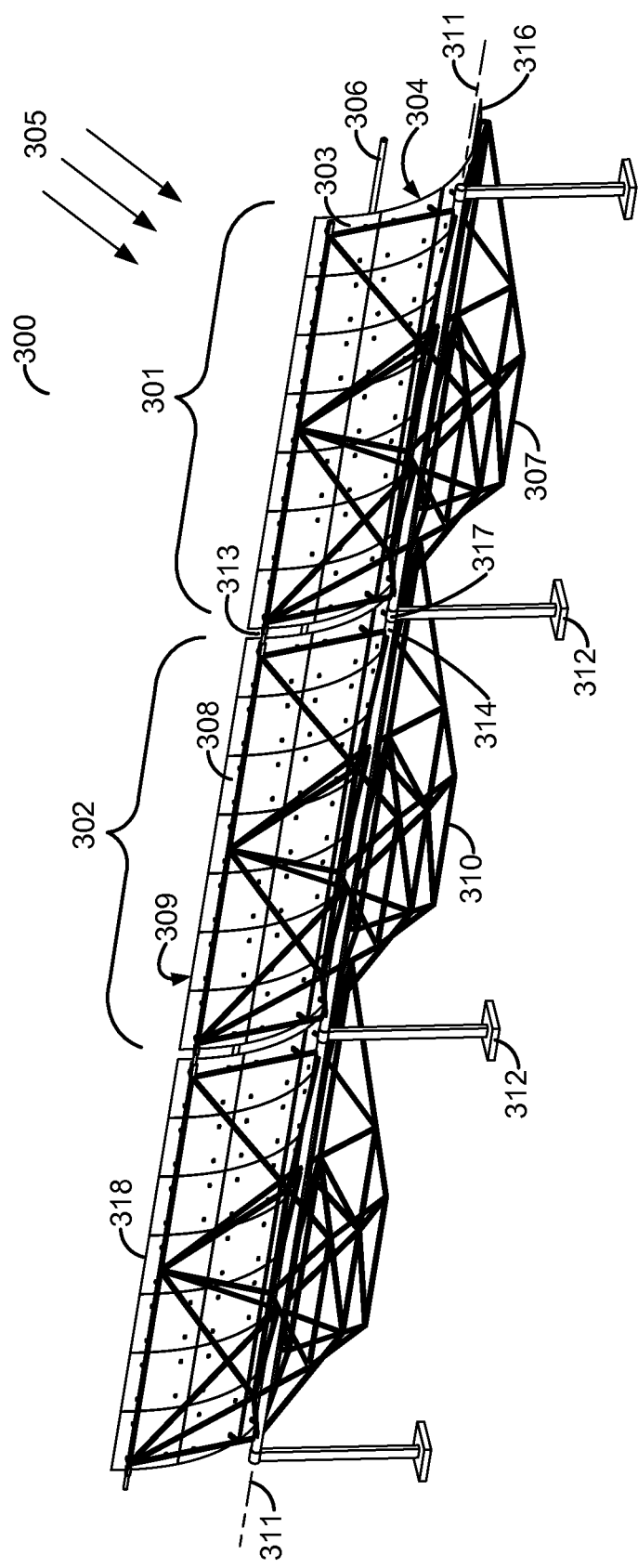
FIGS. 3A-3C depict a portion of a solar collector assembly in accordance with an example embodiment.
Figure 3B:
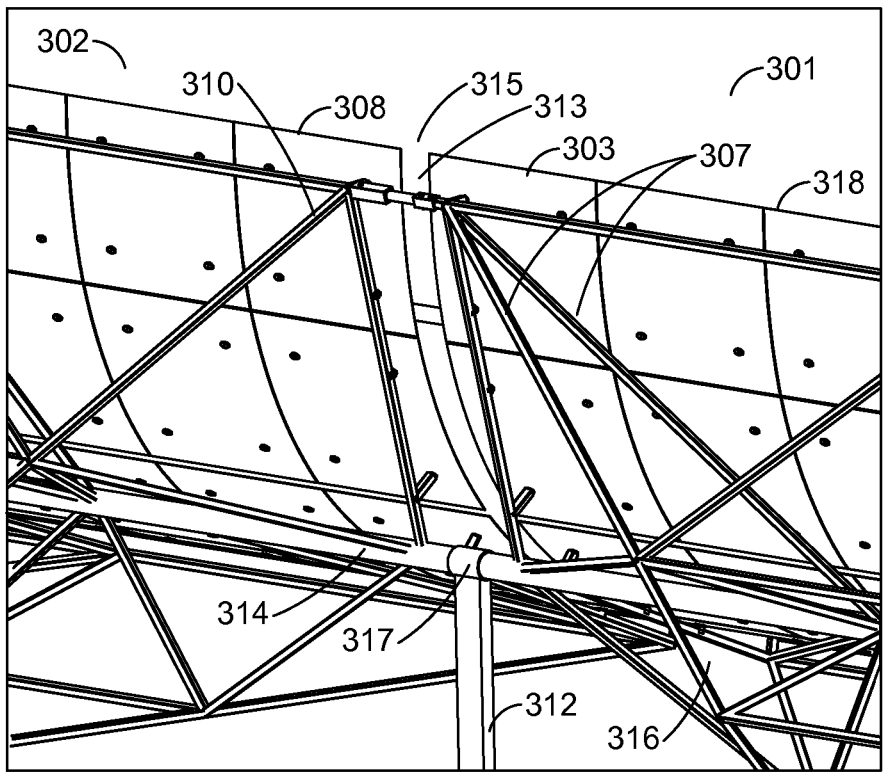
Figure 3C:
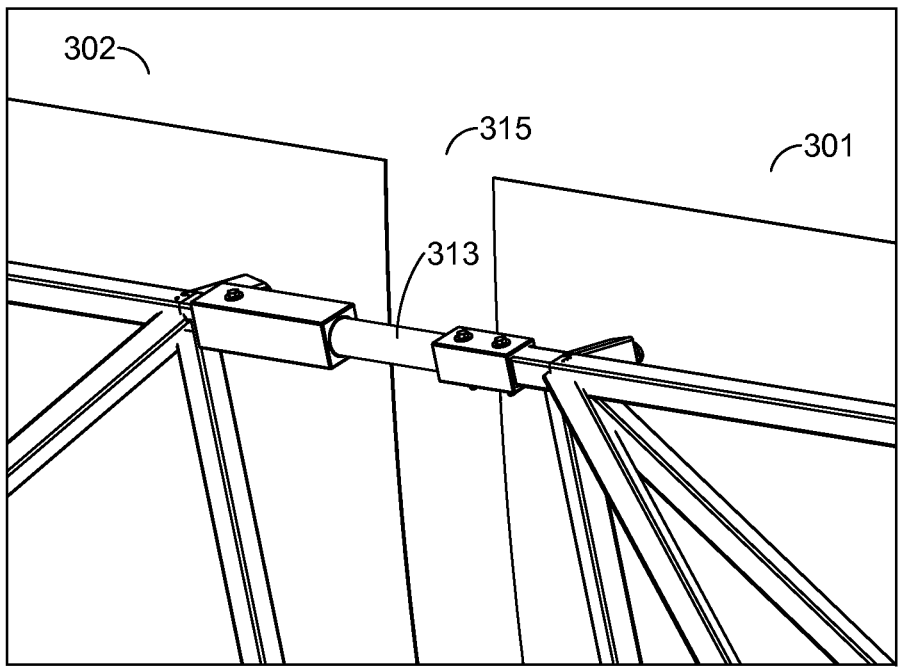

FIGS. 3A, 3B, and 3C depict a portion 300 of an SCA in accordance with a first example embodiment. FIGS. 3B and 3C are detail views of portions of FIG. 3A. SCA portion 300 comprises two collector modules 301 and 302. The invention may be embodied in an SCA having any number of modules greater than one. The first module 301 further comprises a first reflector 303 having a first reflective surface 304 (hidden from view in FIGS. 3A and 3B). The reflective surface 304 is shaped to concentrate incoming solar radiation 305 onto a linear tube 306. In this example embodiment, the reflective surface 304 is parabolic, and the tube 306 is placed at the focus of the parabola defined by the reflective surface 304, but other collector geometries may be used. The reflective surface 304 thus defines a "trough" shape, having edges 316 and 318. In FIG. 3A, one edge 318 is depicted as an upper edge and the other edge 316 is depicted as a lower edge. Working fluid circulates through the tube 306 and is thus heated by the collector. The first collector module 301 also comprises a first three-dimensional structural lattice 307 attached to the back side of the reflector 303, opposite the reflective surface 304. The three-dimensional structural lattice 307 may comprise, for example, a space frame truss made up of substantially rigid members forming interconnected tetrahedral or other geometric shapes, or combinations of shapes. The structural lattice 307 stiffens the module, especially in torsion.

The second collector module 302 comprises a second reflector 308 with a reflective front surface 309 (also hidden from view in FIG. 3A). The second reflector 308 is shaped similarly to the first reflector 303, and also concentrates incoming radiation onto the tube 306. The module 302 also includes a second three-dimensional structural lattice 310.

The reflectors 303 and 308 may each be made of a single piece of reflective material, for example plated or polished sheet steel or aluminum, glass mirrors, or another highly reflective material, or may be made of multiple pieces. Each of the reflective surfaces 304 and 309 includes the entire concentrating reflective area of its respective reflector, whether the reflector is made of a single piece or of multiple pieces. For example, in FIGS. 3A-3C, reflective surface 304 is the parabolic cylinder shape formed by reflector 303, whether reflector 303 is made of a single piece or multiple pieces.

Both modules 301 and 302 are configured to rotate about a common axis of rotation 311 along the length of the modules. The rotational axis 311 may be substantially parallel to and may be displaced from or coincident with the tube 306. The modules 301 and 302 are constrained to rotate about the axis 311 by an axle 314 riding in bearings 317 at the pylon 312. Because the axle 314 need not transmit torque between the modules 301 and 302, it may be smaller than an axle used in prior art systems. The axle 314 undergoes mainly shear and some bending loads, and does not need to be sized for the large torque loads encountered in traditional systems.

Figure 1:
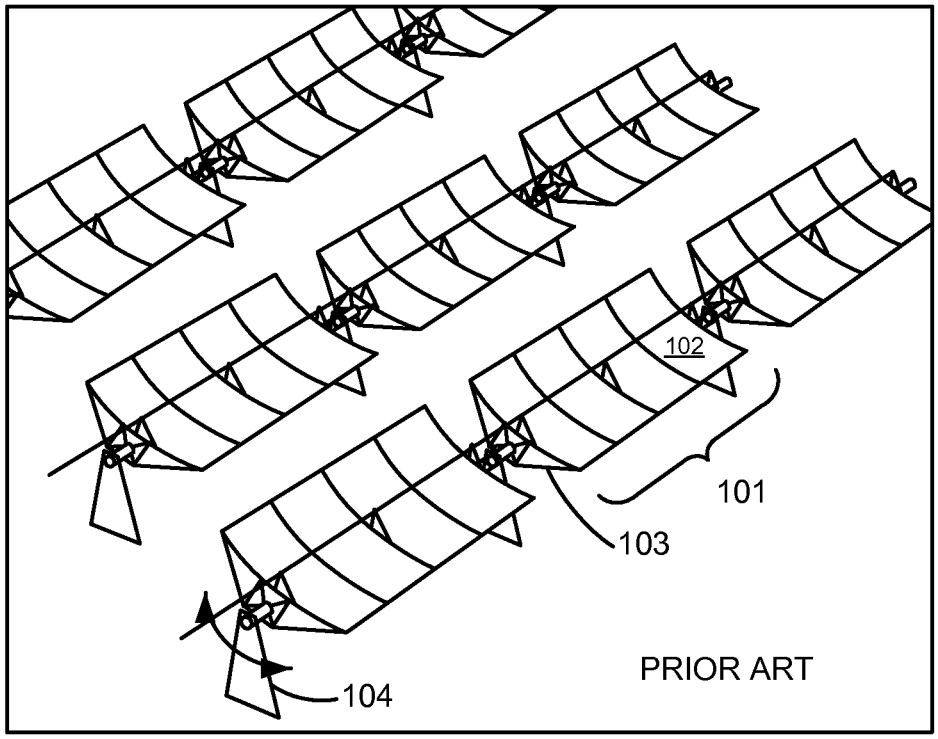
FIG. 1 depicts a portion of a concentrating solar power plant.
Figure 2:
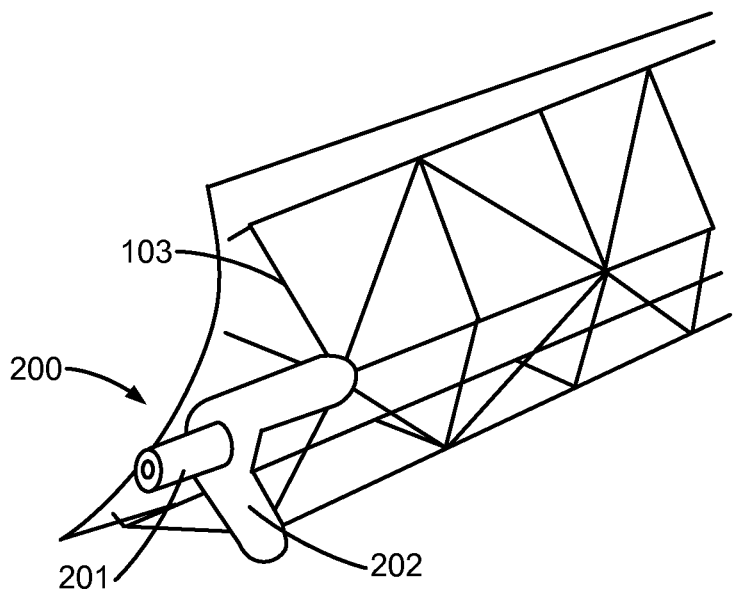
FIG. 2 depicts a portion of a prior art torque transfer assembly.

A torque transfer connection, most easily visible in FIGS. 3B and 3C, directly connects the three-dimensional structural lattices 307 and 310 that support the reflectors 303 and 308, respectively. For the purposes of this disclosure, a direct connection between lattices is one that connects the lattices directly through space, without passing through an axle or shaft at the axis of rotation. A direct connection may be made up of more than one part, such as the telescoping connection or spanning member embodiments discussed below. In the embodiment of FIGS. 3B and 3C, the torque transfer connection comprises a link 313 that extends parallel to the axis of rotation, and connects the lattices 307 and 310 at a location near the edges of the reflectors 303 and 308, substantially removed from the axis of rotation 311. When torque is being transferred from one module to the other, the link 313 is stressed in shear and bending, rather than in torsion as was the case for the conventional torque transfer shaft 201 illustrated in FIG. 2. Preferably, the link 313 is short so that the shear stresses dominate, rather than bending stresses. During torque transfer, a complementary force is exerted on the axle 314. In some embodiments, the axle 314 undergoes little or no axial torsional stress during the torque transfer, and need not be sized for the transmission of significant torque.

Preferably, the torque transfer connection comprising the link 313 spans a gap 315 between the reflectors 303 and 308 at only one edge 318 of the trough. At the other edge 316, the gap 315 is left unobstructed to allow rotation of the assembly past the pylons 312. For example, during darkness or inclement weather, the assembly 300 may be rotated so that the reflectors point downward to reduce their exposure to possible damage.

The torque transfer connection is preferably substantially rigid in the direction transverse to the axis of rotation. This rigidity minimizes relative rotation between the modules 301 and 302 during torque transfer, and helps to maintain proper aiming of the reflectors. In some embodiments, the torque transfer connection is compliant in a direction parallel to the axis of rotation, to accommodate thermal expansion and contraction of the assembly. For example, the link 313 may be a telescoping link that can withstand considerable force in shear, thereby transmitting torque between the modules, but can withstand little or no force in axial tension or compression, thereby accommodating axial thermal expansion and contraction of the modules.

Figure 4:
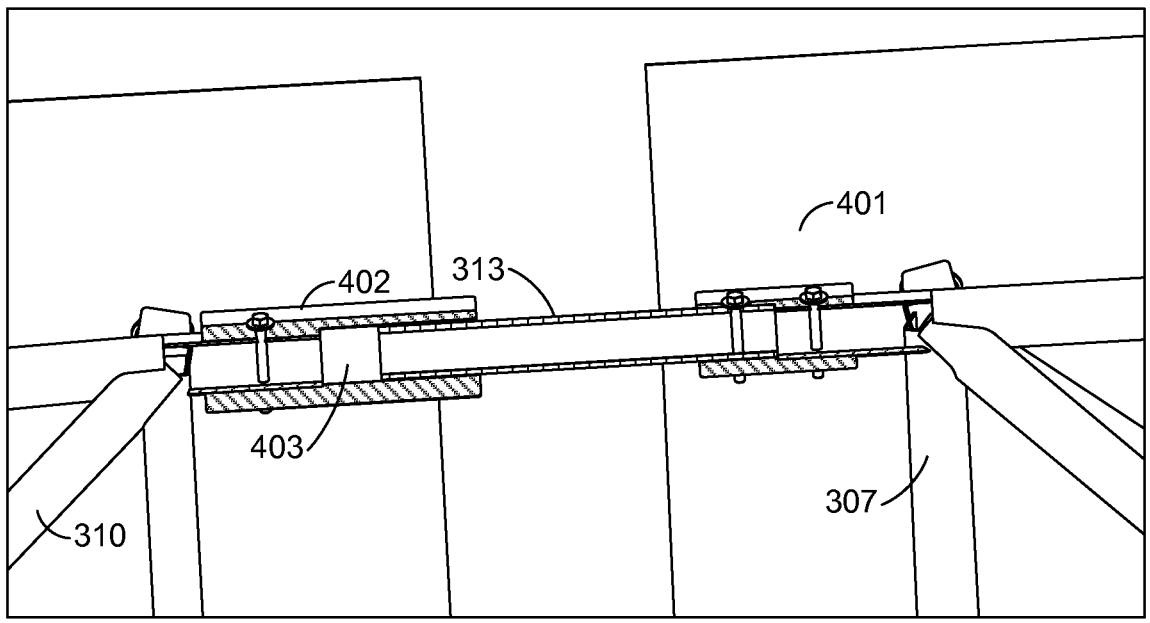
FIG. 4 depicts a cutaway perspective view of a telescoping embodiment of a link.

FIG. 4 depicts a cutaway perspective view of a telescoping embodiment of the link 313. In this embodiment, the link 313 is rigidly attached at a first end 401 of the three-dimensional structural lattice 307, and extends parallel to the axis of rotation 311. A receiver 402 is rigidly attached to the three-dimensional structural lattice 310, and includes a bore 403 parallel to the axis of rotation 311 and sized to slidingly receive the link 313. The link 313 and the receiver 402 thus make up a torque transfer connection that is compliant in a direction parallel to the axis of rotation 311, and substantially rigid in a direction transverse to the axis of rotation 311. If each pair of modules includes a telescoping link system, then expansion and contraction of the collector assembly does not accumulate along the length of the assembly, so that each telescoping link need only accommodate the expansion and contraction of a single collector module. Thus, the telescoping link system between modules as described herein provides independent expansion and contraction of the modules. The receiver 402 and the bore 403 are preferably sized to accommodate at least the expected thermal expansion and contraction of one of the modules 301 and 302.

Figure 5:
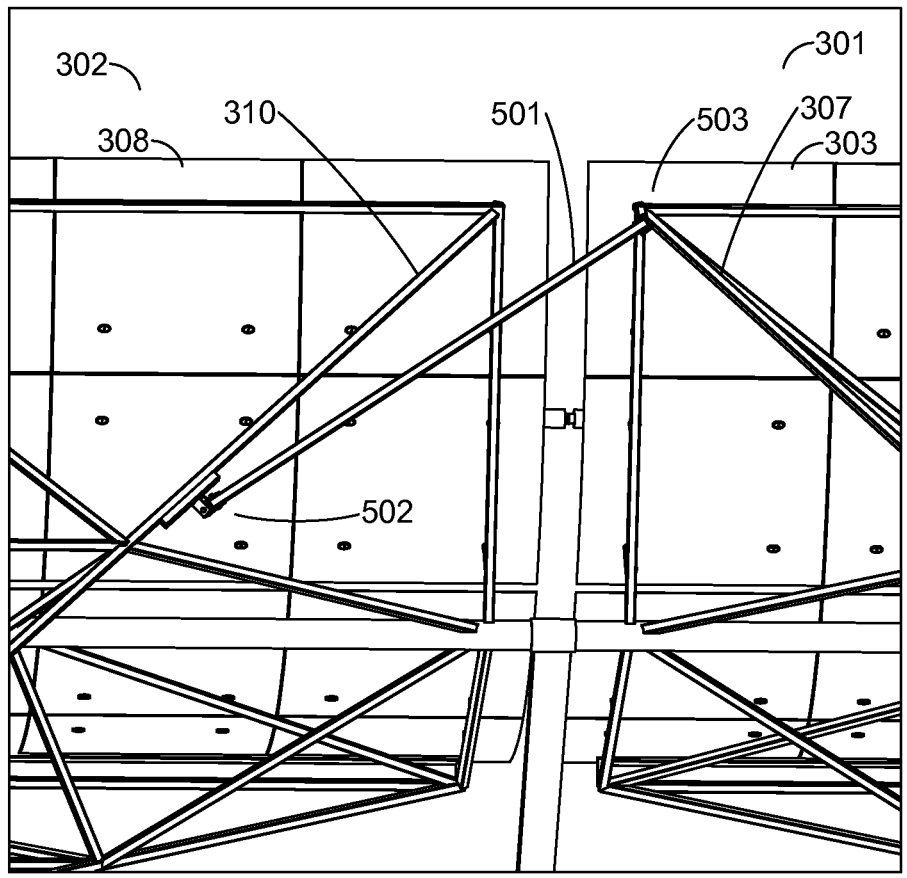
FIG. 5 illustrates a torque transfer connection in accordance with another example embodiment.

FIG. 5 illustrates a torque transfer connection in accordance with another example embodiment. In this embodiment, a spanning member 501 attaches to the three-dimensional structural lattice 307 at a first end 502, and attaches to the three-dimensional structural lattice 310 at a second end 503. This kind of torque transfer connection may be called a "frame-to-corner" connection. In this embodiment, the spanning member 501 is not parallel to the axis of rotation, and attaches to the structural lattice 310 close to the reflector 308, but attaches to the structural lattice 307 at a distance further away from the reflector 303. Preferably, the spanning member 501 is substantially rigid, and can transfer significant forces between the modules 301 and 302.

Figure 6:
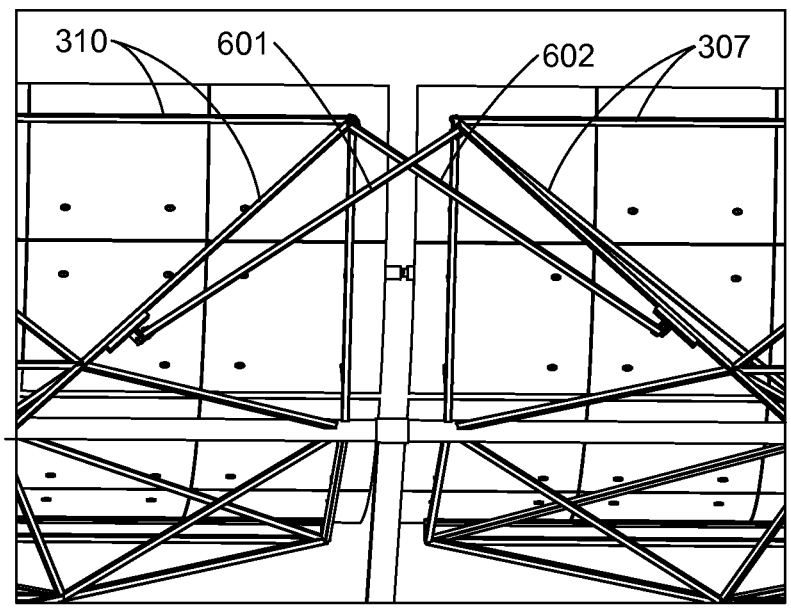
FIG. 6 illustrates a torque transfer connection in accordance with yet another embodiment.

FIG. 6 illustrates a torque transfer connection in accordance with yet another embodiment. This embodiment may be called a "dual frame-to-corner" connection. In this embodiment, two spanning members 601 and 602 connect the structural lattices 307 and 310 in crisscross fashion. Neither of the spanning members 601 and 602 is parallel to the axis of rotation 311.

It should be apparent that multiple torque transfer connections may be used together, in any workable combination. For example, a link such as the link 313 may be used in conjunction with one or more spanning members such as members 501, 601, and 602, or multiple links 313 may be used.

Figure 7:
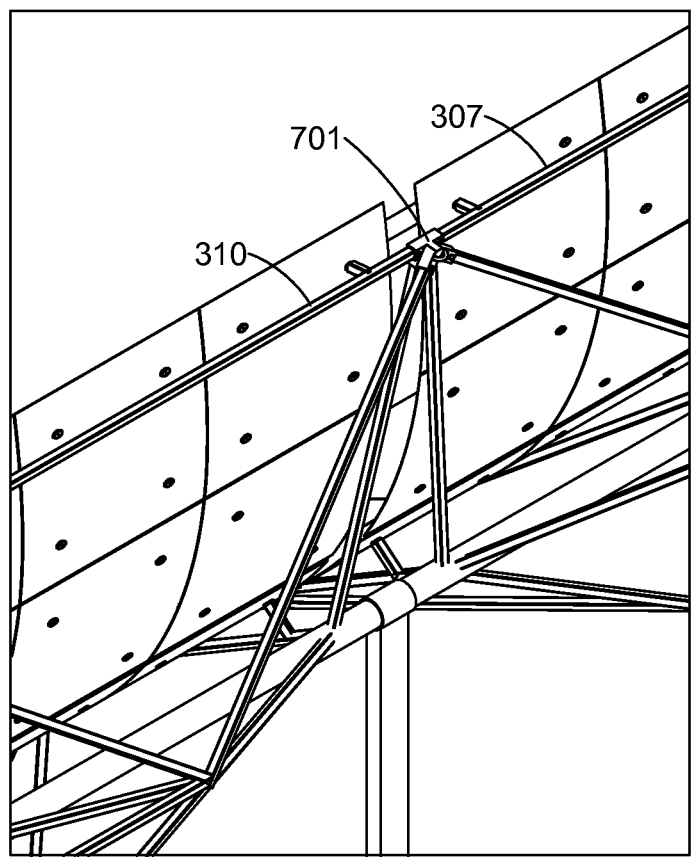
FIG. 7 depicts a torque transfer connection according to another embodiment.

FIG. 7 depicts a torque transfer connection according to another embodiment. In this embodiment, a fitting 701 receives and connects members from the two structural lattices 307 and 310. The fitting 701 may receive and connect one or more members from each structural lattice.

Figure 8:
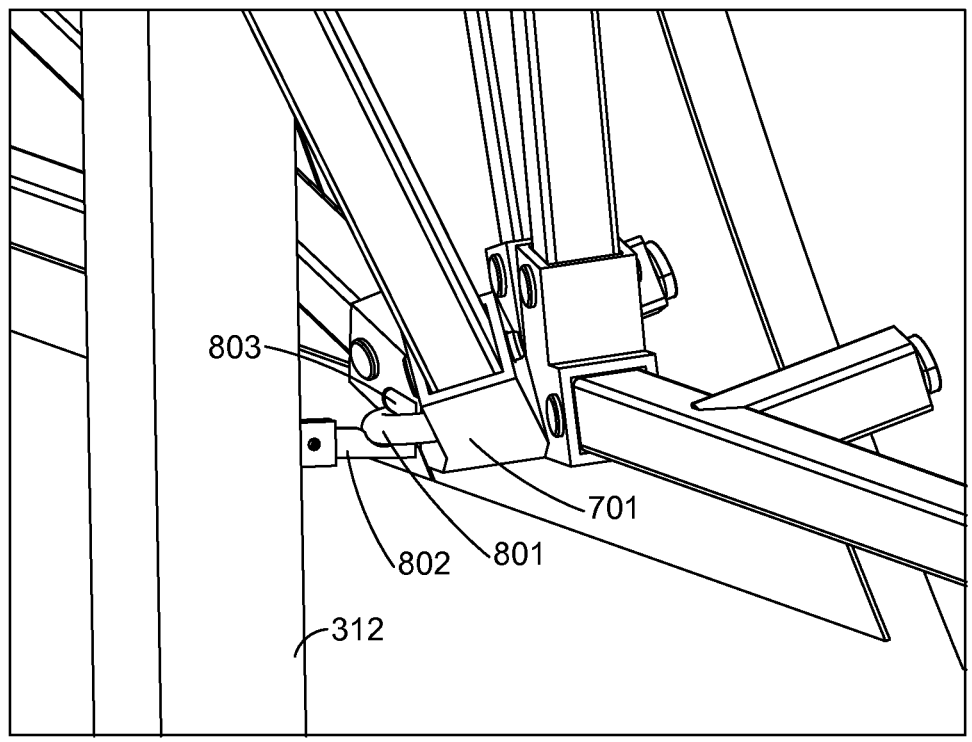
FIG. 8 shows a close-up view of an example fitting.

FIG. 8 shows a close-up view of the example fitting 701, when the collector assembly has been rotated to a "safety" position wherein the torque transfer connection (the fitting 701) is adjacent one of the pylons 312. In this embodiment, the fitting 701 comprises a hoop or receptacle 801 configured to receive a latch 802 attached to the pylon 312 or to a base, for example a foundation, of pylon 312. The solar collector assembly comprising the modules 301 and 302 may be rotated to this position, for example, during periods of high wind or other inclement weather. When the latch 802 is engaged with the hoop 801, the pylon 312 resists the rotation of the collector modules 301 and 302, and torques are therefore not transmitted between these modules. Similar latches may be used between other modules in an SCA. With the latch 802 engaged with the hoop or receptacle 801, the SCA is protected from damage that may otherwise occur from high wind loading that accumulates very large torques along the SCA.

The latching mechanism 801, 802 may be configured to automatically engage, automatically release, or both. For example, the latch 802 may be a spring latch having a ramp 803, so that the latch 802 is automatically pushed open when the hoop or receptacle 801 engages it. In the case of such a simple mechanical latch, it may be necessary for a technician to manually release the latch. Alternatively, latch 802 may be automatically engaged and released, for example by electrical actuation.

A latch such as the example latch 802 may be used with other kinds of torque transfer connections as well. For example, with a link such as the link 313, or with other torque transfer connections.

Figure 9:
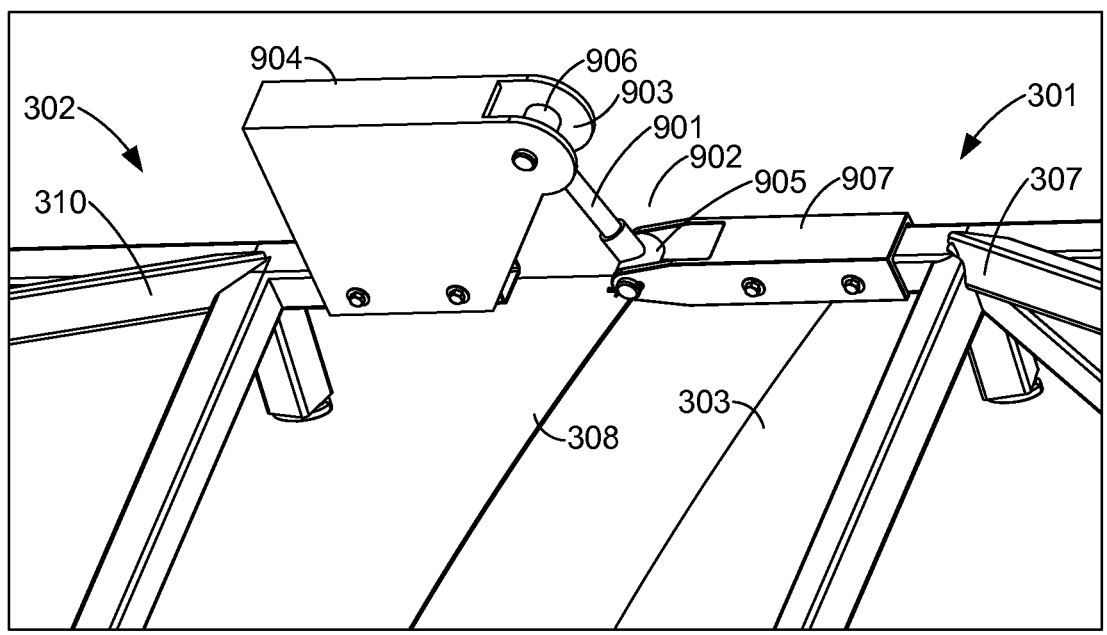
FIG. 9 depicts a torque transfer connection in accordance with another example embodiment.

FIG. 9 depicts a torque transfer connection in accordance with another example embodiment. In this embodiment, an adjustable-length link 901 has a first end 902 and a second end 903. The first end 902 is rotatably coupled to the structural lattice 307 through a connector 907 and the second end 903 is rotatably coupled to the structural lattice 310 through a yoke 904. Preferably, the adjustable-length link 901 is oriented approximately perpendicular to the axis of rotation 311. In this discussion, "perpendicular to the axis of rotation" does not necessarily mean that the extended axis of the link would pass through the axis of rotation, but merely that the dot product of a vector along the axis of the link and a vector along the axis of rotation would be near zero. For example, the two vectors may be within 5 degrees of perpendicular, within 10 degrees of perpendicular, within 20 degrees of perpendicular, or some other amount. In this way, torque can be transferred between the modules 301 and 302 through the link 901, while the link 901 experiences mainly axial tension and compression. The rotatable couplings allow the link 901 to swivel, thus accommodating thermal expansion and contraction of the modules 301 and 302. This kind of torque transfer connection is also therefore compliant in a direction parallel to the axis of rotation 311, and substantially rigid in a direction transverse to the axis of rotation 311. The adjustability of the length of the link 901, allows adjustment of the nominal rotational alignment of the modules 301 and 302. For example, the link 901 may be a turnbuckle or other device that adjusts the spacing between the fittings 905 and 906 as the link 901 is rotated. The nominal length of the link 901 is sufficient that the swiveling caused by thermal expansion and contraction introduces only negligible changes in rotational alignment between the modules 301 and 302. Preferably, other modules in the SCA are similarly compliantly coupled, so that thermal expansion and contraction do not accumulate along the length of the SCA.

Figure 10:
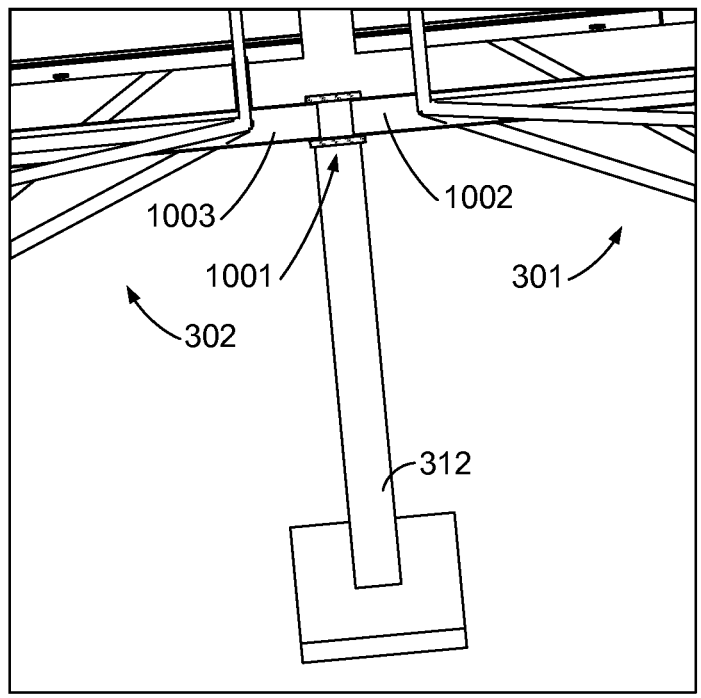
FIG. 10 shows a supporting arrangement for collector modules, in accordance with one embodiment.

The mounting of the collector modules to pylons or other support structures, and the constraining of adjacent modules to rotate about a common axis, may be accomplished in any of a number of ways. FIG. 10 shows a supporting arrangement for collector modules, in accordance with one embodiment. In the embodiment of FIG. 10, the collector module 301 includes an axle segment 1002 at the axis of rotation, and the collector module 302 includes an axle segment 1003, also at the axis of rotation. While the axle segments 1002 and 1003 are shown as extending for the entire lengths of their respective collector modules, this is not necessary. A shorter segment at each end of a collector module may suffice, with a suitable structural lattice. In FIG. 10, the axle segments 1002 and 1003 are commonly journaled in a bearing 1001 at the top of the pylon 312. Alternatively, separate bearings or even separate pylons may be used for the individual modules. The axle segments 1002 and 1003 are not structurally joined, and may be spaced apart to accommodate thermal expansion of the modules 301 and 302. This arrangement may be particularly convenient for construction and servicing of the SCA, as modules may be relatively easily placed in and removed from the SCA.

Figure 11:
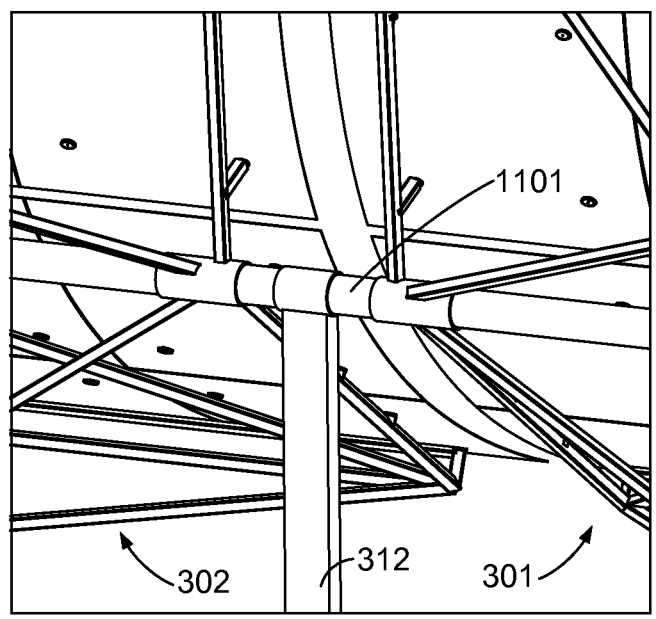
FIG. 11 shows a supporting arrangement for collector modules, in accordance with another example embodiment.

FIG. 11 shows a supporting arrangement for collector modules, in accordance with another example embodiment. In this embodiment, a common axle at the axis of rotation extends between the adjacent collector modules 301 and 302. In the example shown, a common axle 1101 is a separate part, and each collector module includes a journal bearing that rides on the axle 1101. However, many other arrangements are possible. For the purposes of this disclosure, a "common axle" is any axle portion that extends from one module to another through a bearing or support. For example, either of the axle segments 1002 or 1003 shown in FIG. 10 could be extended to reach the other module, and would be considered a "common axle". The modules may be configured to rotate freely on the common axle, as shown in FIG. 11, or the modules may be fixed to the common axle, or one module may be fixed to the common axle and the other configured to rotate freely on the common axle. The common axle may rotate in a bearing at the top of a pylon such as the pylon 312, or may not rotate. One of skill in the art will recognize that many configurations are possible. In the case where the two modules are fixed to a common axle, the common axle may participate in the transfer of torque between adjacent modules. However, even when the common axle participates in torque transfer, the axle may be of a smaller size than used in traditional systems, because much of the torque transfer is performed by the torque transfer connection at the periphery of the modules.

In another embodiment, a method of assembling a solar collector assembly comprises placing two modules onto pylons. Each module comprises a reflector having a reflective front surface shaped to concentrate incoming radiation on a linear tube, and a three-dimensional structural lattice attached to the reflector opposite the reflective surface. The modules are constrained to rotate about a common axis of rotation parallel to the linear tube, and the assembly method further comprises directly connecting the structural lattices at a location removed from the axis of rotation. Connecting the structural lattices may comprise connecting a link to both structural lattices, wherein the link extends substantially parallel to the axis of rotation. Connecting the structural lattices may comprise attaching a spanning member to each structural lattice in a "frame-to-corner" arrangement, such that the spanning member attaches to the two structural lattices at different distances from the reflective surfaces of the two modules. Connecting the structural lattices may comprise attaching two spanning members in a "dual frame-to-corner" arrangement. The connection between the structural lattices may be compliant in a direction parallel to the axis of rotation, and substantially rigid in a direction transverse to the axis of rotation.

Figure 12:
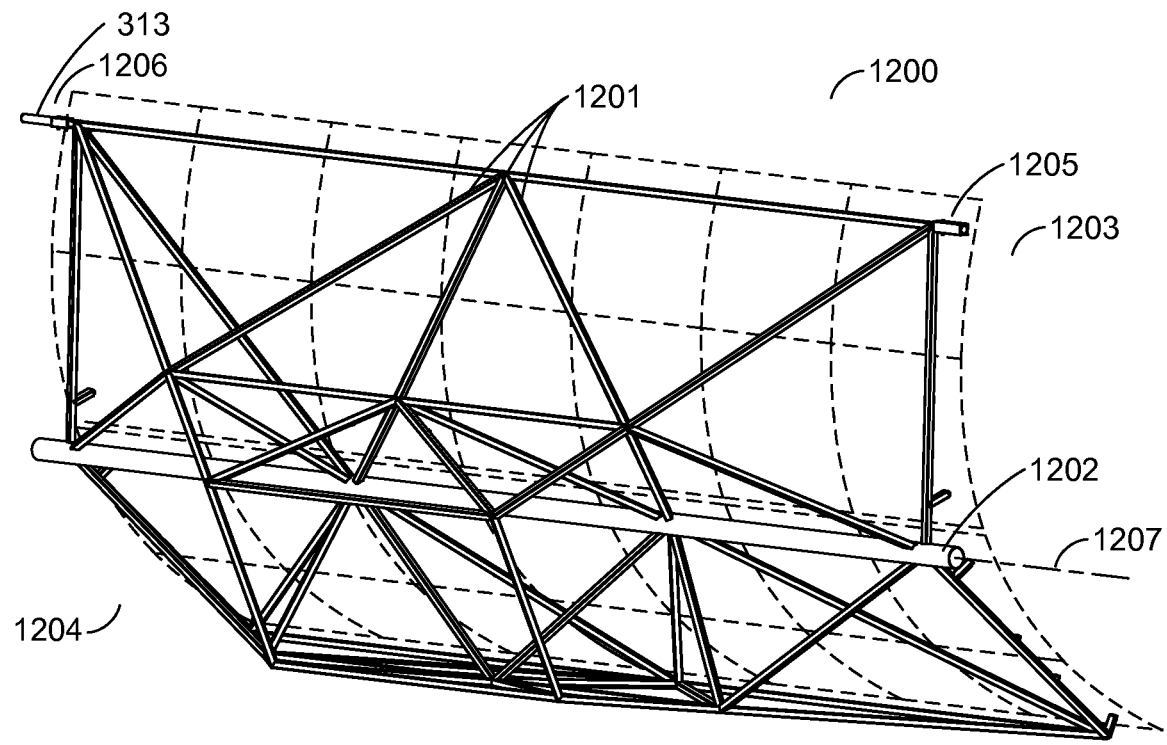
FIG. 12 shows a three-dimensional structural lattice in accordance with an example embodiment.

FIG. 12 shows a three-dimensional structural lattice 1200 in accordance with an example embodiment. The structural lattice 1200 comprises a plurality of substantially rigid elongate members (some of which are indicated as members 1201) configured to attach to a concentrating solar collector reflector. The elongate members may be, for example, square or round tubing made of steel, aluminum, fiber reinforced plastic, carbon composite, or another structural material, having a width or diameter of three or four inches, although other shapes, materials, combinations of materials, and sizes may be used. Preferably, the elongate members are arranged in three-dimensional shapes, such as tetrahedral or other polyhedral shapes, so that the overall lattice is substantially rigid. The structural lattice 1200 may be assembled by welding, by bolting together the elongate members 1201 and other components, or by any other suitable fabrication process. Many arrangements of the elongate members are possible, and the arrangement shown in FIG. 12 is but one example. The structural lattice 1200 also includes an element that constrains the lattice 1200 to rotate about an axis of rotation 1207. For example, an axle 1202 shown in FIG. 12 may serve this purpose. The axle 1202 may be configured to engage bearings on pylons, for example, and may also be a structural part of the lattice, although this is not required. Alternatively, the lattice 1200 may include bearings configured to engage an axle or other support. The structural lattice 1200 has first and second ends 1203 and 1204, and first and second connectors 1205 and 1206 at the first and second ends 1203 and 1204, respectively. Each of the connectors 1205 and 1206 is displaced from the axis of rotation, and is configured to receive a torque transfer connecting device. The term "connector" is intended to be construed broadly. In the example of FIG. 12, the connectors are configured to receive links such as the link 313, but many other kinds of connectors are possible. For example, the connectors may be integrally formed in the lattice 1200, or may be separate parts joined to the lattice 1200. The connectors could be as simple as the ends of the structural members being sized and positioned to receive a fitting such as the fitting 701, or the connectors may be holes configured to receive bolts that mount a torque transfer connection such as that shown in FIG. 9.

Each connector is also spaced a distance from the reflective surface, usually behind the reflector. The connectors may be spaced the same distance from the reflector, as in the case of receptacles for links such as the link 313, or may be spaced different distances from the reflector, as in the case of mounting holes for spanning members such as the spanning member 501.

Figure 13:
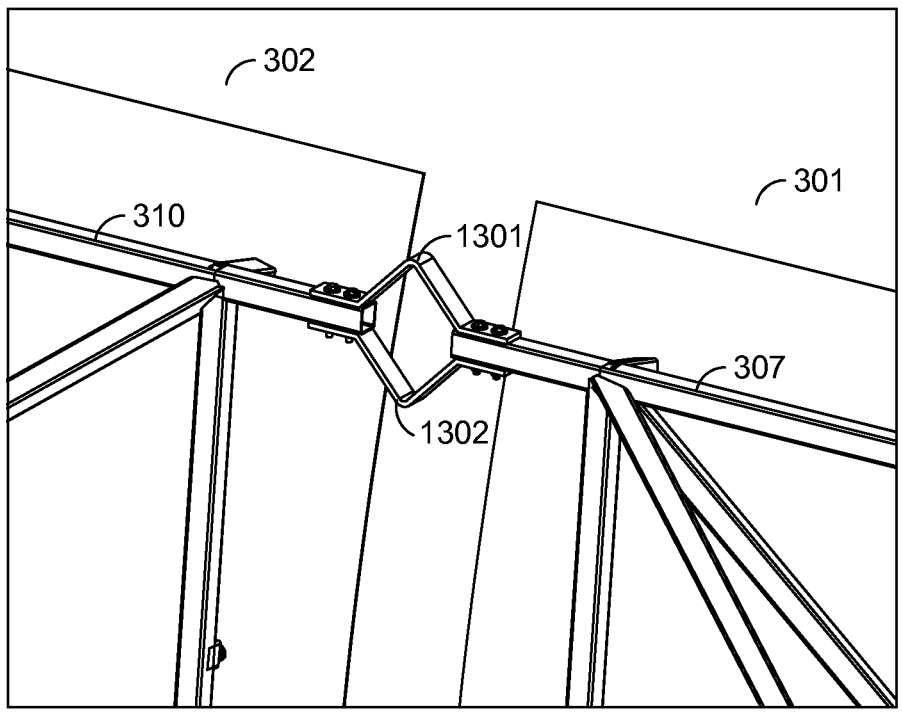
FIG. 13 depicts a torque transfer connection in accordance with another example embodiment.

FIG. 13 depicts a torque transfer connection in accordance with another example embodiment. In this embodiment, bent strap members 1301 and 1302 are bolted or otherwise affixed to the structural lattices 307 and 310. The strap members 1301 and 1302 are positioned so that they are relatively rigid in a direction transverse to the axis of rotation, and therefore can effectively transmit torque between the modules 301 and 302. However, the strap members 1301 and 1302 are also oriented so that axial force between the modules 301 and 302 can relatively easily cause the strap members 1301 and 1302 to flex, thus accommodating thermal expansion and contraction of the modules 301 and 302. This is another example of a torque transfer connection that is substantially rigid in a direction transverse to the axis of rotation, but is compliant in a direction parallel to the axis of rotation. The torque transfer connection of FIG. 13 accomplishes the compliance through flexing of members, rather than sliding or rotation as were used in previously-described embodiments.

Other kinds of torque transfer connections may also accommodate thermal expansion and contraction using flexing of members. For example, the spanning members 601 and 602 in the dual frame-to-corner connection shown in FIG. 6 may flex to accommodate thermal expansion and contraction.

Figure 14:
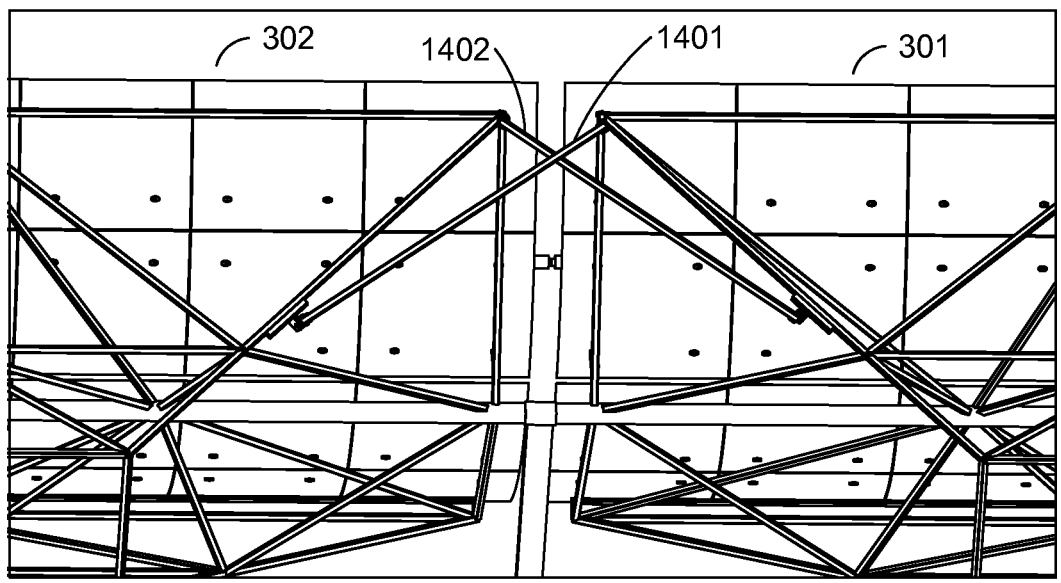
FIG. 14 shows a torque transfer connection in accordance with another example embodiment.
Figure 15:
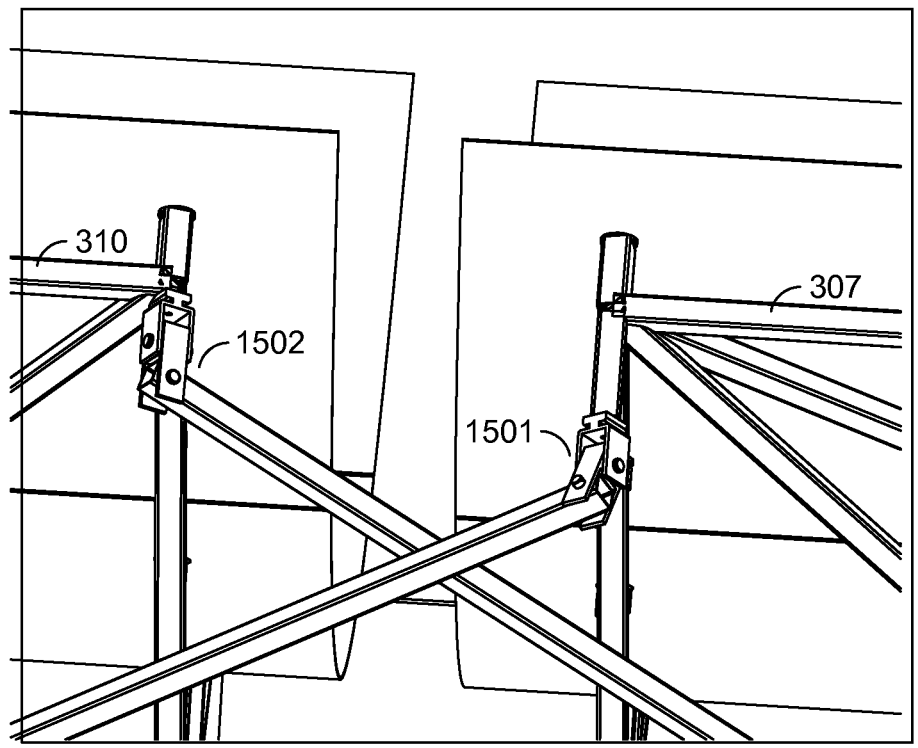
FIG. 15 shows an enlarged view of part of the torque transfer connection of FIG. 14.
Figure 16:
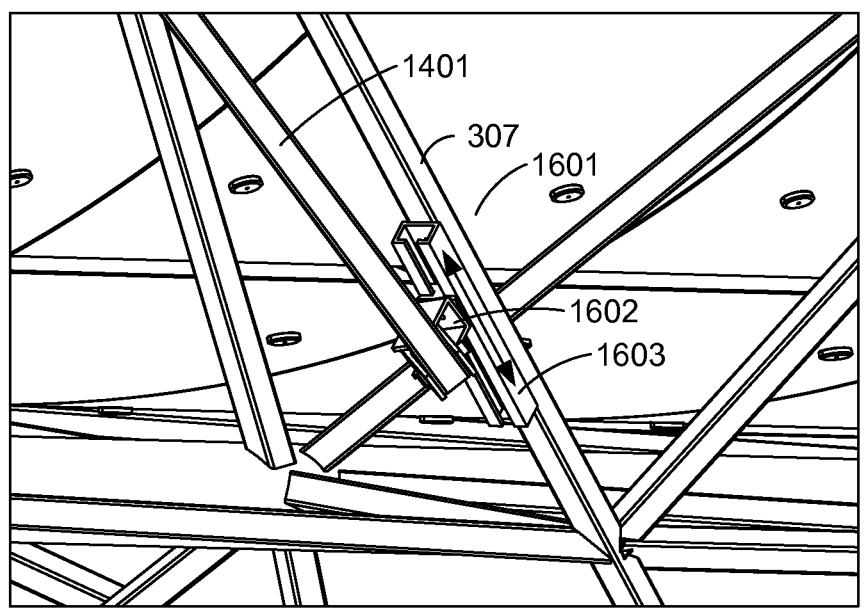
FIG. 16 shows an enlarged view of another part of the torque transfer connection of FIG. 14.

FIGS. 14-16 illustrate a dual frame-to-corner connection that allows adjustment of the rotational alignment of adjacent modules. As shown in FIG. 14, the modules 301 and 302 are connected by spanning members 1401 and 1402. As is shown in FIG. 15, the spanning members 1401 and 1402 connect at one end to the structural lattices 307 and 310 through compliant connections 1501 and 1502. As is shown in FIG. 16, The spanning members 1401 and 1402 connect at the other end to the structural lattices 307 and 310 using adjustable connections such as adjustable connection 1601 between the spanning member 1401 and the structural lattice 307. The adjustable connection 1601 places a linkage 1602 between the spanning member 1401 and the structural lattice 307. The linkage 1602 connects in turn to channel 1603. The position of the linkage 1602 is adjustable within the channel 1603, and affects the rotational alignment of the segments 301 and 302. Once the proper alignment is achieved, the linkage can be bolted or otherwise fixed in place along channel 1603, locking the rotational alignment of the segments 301 and 302.

Figure 17:
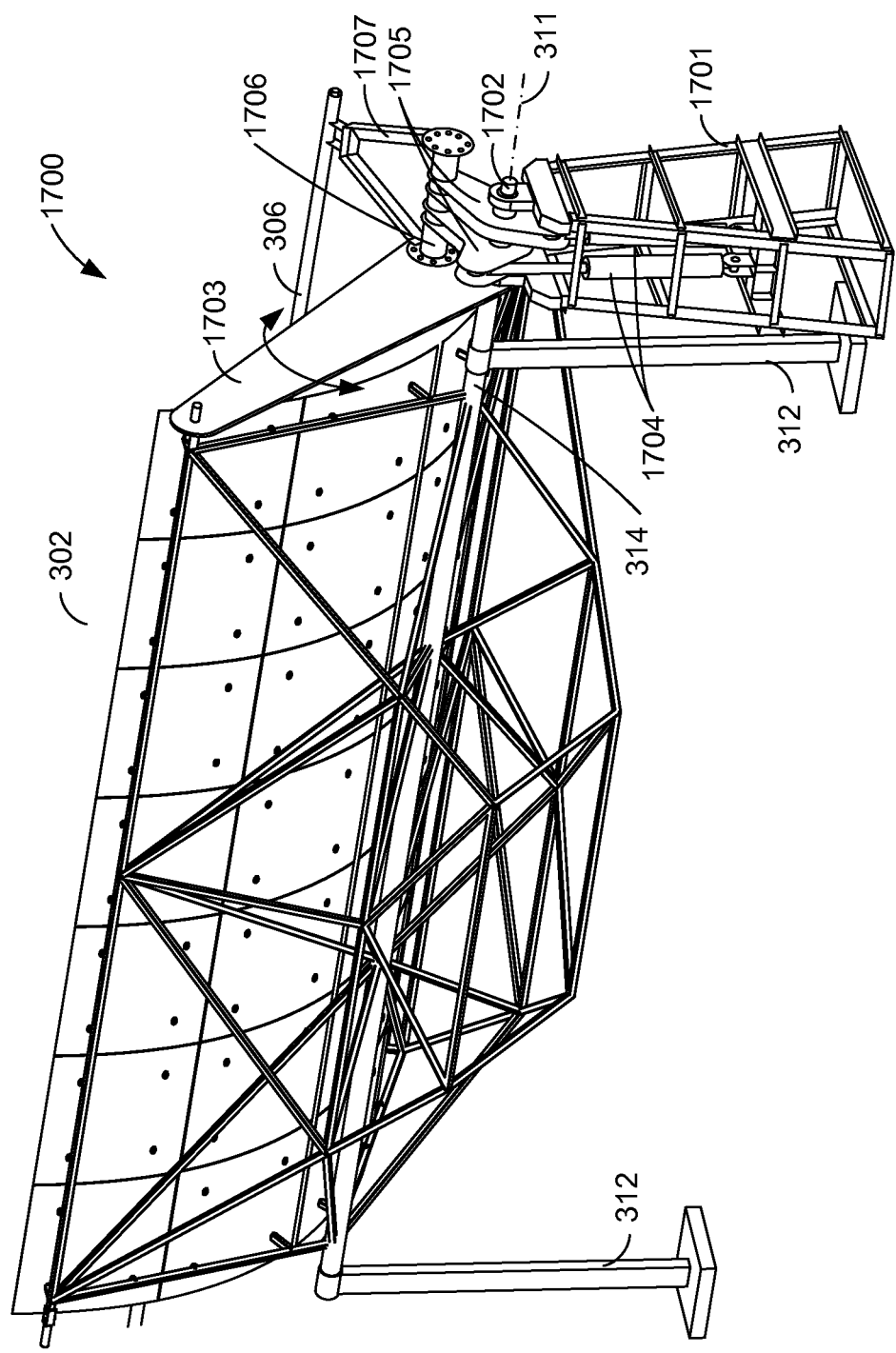
FIG. 17 depicts a drive system, in accordance with an example embodiment.

FIG. 17 shows a drive system 1700 in accordance with an embodiment of the invention. As was described above, a row of collector modules, or SCA, may be driven from one end, or from a point within the SCA, for example the middle. Only one driver need be used, as torque is transferred between adjacent modules down the row via the torque transfer connections already described. The drive system 1700 includes a support base 1701, holding a driving mechanism for driving the collector module 302, which is supported on the pylons 312. One of skill in the art will recognize that the support base 1701 may be integrated with, replace, or perform the functions of one or more of the pylons 312.

The drive system 1700 also includes an axle 1702, placed at the axis of rotation 311 of the module 302. The axle 1702 may be, but need not be, coupled to the axle 314 of the module 302. The drive system 1700 further comprises an arm 1703 that is driven to rotate about the axle 1702, and extends to the edge of the module 302, where it transfers torque to the structural lattice 310 of the module 302, for example using one of the kinds of torque transfer connections described above. While the arm 1703 is depicted as a flat, solid plate, one of skill in the art will recognized that it may also be formed as a truss or other structure for efficient use of material.

In the drive system 1700, a pair of hydraulic cylinders 1704 actuate the system. One end of each of the hydraulic cylinders 1704 is pinned to the support base 1701. The other end of each of the hydraulic cylinders 1704 is pinned to one of lever clevises 1705. Each of the lever clevises 1705 is constrained to rotate with or about the shaft 1702. The lever clevises 1705 include complementary offset arm segments that enable the hydraulic cylinders 1704 to rotate the lever clevises about the shaft 1702. Each of the lever devises also includes an arm segment extending to a bar 1706, such that as the lever clevises 1705 rotate around the axle 1702, the bar 1706 does also. The arm 1703 is affixed to the bar 1706 such that the arm 1703 is driven by the bar 1706 to also rotate about the axis 311. Working in concert, the hydraulic cylinders 1704 can position the module 302 at any desired angular orientation. The total angular operating range of the system may be about 240 degrees, allowing for tracking of the sun throughout the day, and for positioning the modules in a safe orientation at night or in times of inclement weather. The drive system 1700 may also include a support structure 1707 for supporting the tube 306 that carries the fluid heated by the collector assembly.

Figure 18:
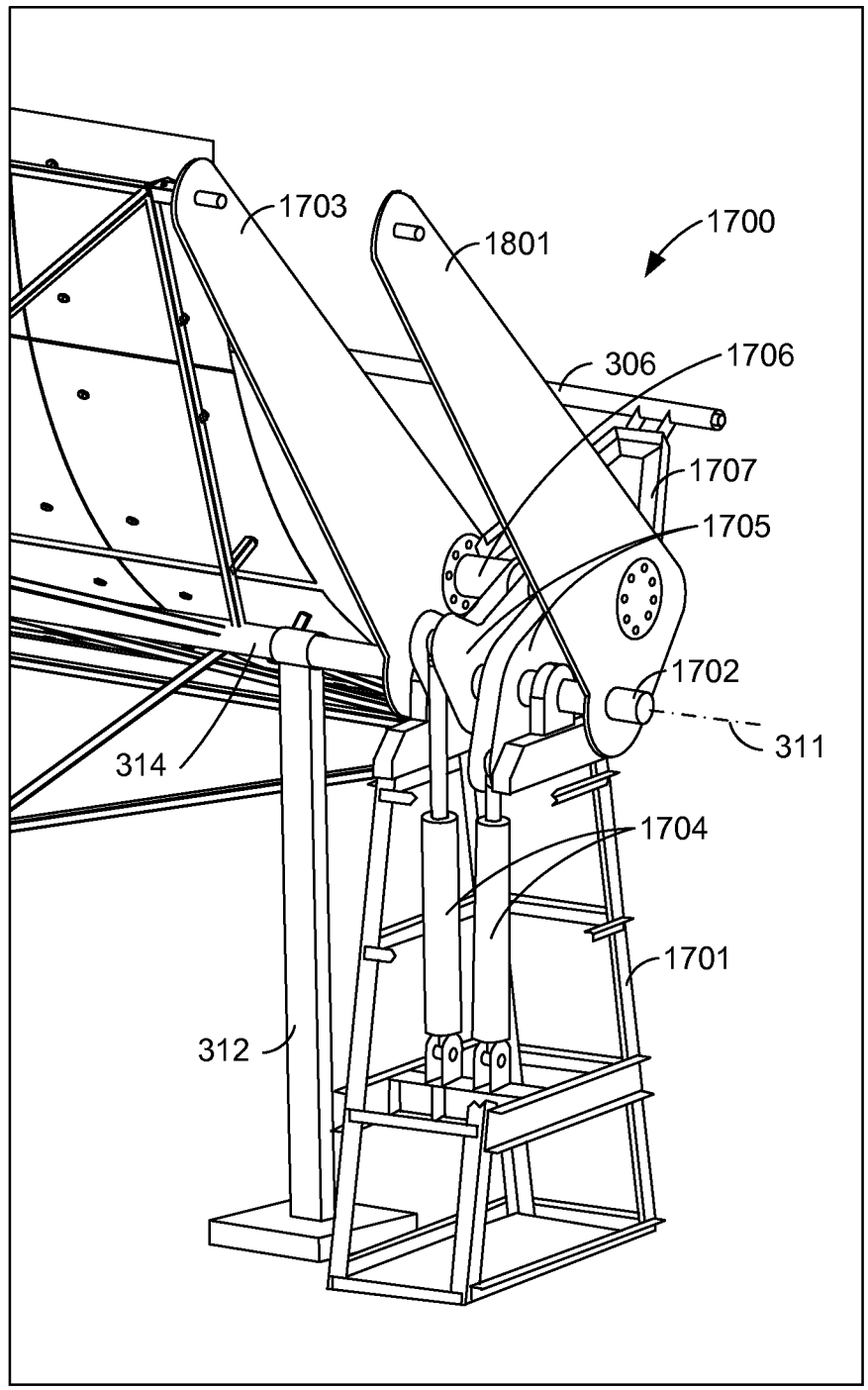
FIG. 18 depicts an enlarged view of the drive system of FIG. 17.

FIG. 18 shows an enlarged view of a portion of FIG. 17. In FIG. 18, parts of the support base 1701 have been cut away for better viewing of the workings of the drive system 1700. A second arm 1801 is also shown, emphasizing that the drive system 1700 may be used to drive an SCA from a point within the SCA as well as from an end. When driving an SCA from an inner point, the arm 1703 would drive the module 302 and additional modules connected through torque transfer connections to the module 302, while the second arm 1801 would drive a similar set of modules extending from the other side of the drive system 1700.

While the example drive system 1700 uses the hydraulic cylinders 1704 to impart rotation to the collector array including the module 302, one of skill in the art will recognize that other kinds of mechanisms could impart torque to the arm 1703, and thus to the module 302 at an edge of the module 302. For example, the arm 1703 could be affixed to a pulley that rotates around the axis 311, and the pulley could be driven by a belt, chain, or other mechanism. Alternatively, the shaft 1702 could be directly driven by a motor, or driven by a motor through a set of gears, to rotate the arm 1703. Many other kinds of mechanisms are possible.

The present invention has been described above in terms of presently preferred embodiments so that an understanding of the present invention can be conveyed. There are, however, many configurations for collector systems not specifically described herein but with which the present invention is applicable. The present invention should therefore not be seen as limited to the particular embodiments described herein, but rather, it should be understood that the present invention has wide applicability with respect to collector systems generally. All modifications, variations, or equivalent arrangements and implementations that are within the scope of the attached claims should therefore be considered within the scope of the invention.

What is claimed is:
1. A trough collector system, comprising:
a first module comprising a first reflector having a first reflective front surface shaped to concentrate incoming radiation on a linear tube, and a first three-dimensional structural lattice attached to the first reflector opposite the first reflective front surface;

a second module comprising a second reflector having a second reflective front surface shaped to concentrate incoming radiation on the linear tube, and a second three-dimensional structural lattice attached to the second reflector opposite the second reflective front surface, wherein the first and second modules are constrained to rotate about a common axis of rotation parallel to the linear tube; and a torque transfer connection directly connecting the first three-dimensional structural lattice to the second three-dimensional structural lattice at a location removed from the axis of rotation, wherein the torque transfer connection comprises a spanning member that attaches to the first three-dimensional structural lattice and attaches to the second three-dimensional structural lattice, and wherein the spanning member is not parallel to the axis of rotation.

2. The trough collector system of claim 1, wherein the spanning member is substantially rigid.

3. The trough collector system of claim 1, wherein the spanning member is a first spanning member, the trough collector system further comprising a second spanning member that attaches to the first three-dimensional structural lattice and attaches to the second three-dimensional structural lattice, wherein the second spanning member is not parallel to the axis of rotation.

4. The trough collector system of claim 1, further comprising:
    a pylon between and at least partially supporting the first and second three-dimensional structural lattices; and
    a latch, configured to releaseably latch at least one of the modules to the pylon or a base of the pylon, the latch including a movable element to couple the pylon or the base of the pylon to either or both of the first and second three-dimensional structural lattices.

5. The trough collector system of claim 1, wherein each module includes two outer edges parallel to the axis of rotation and two ends transverse to the axis of rotation, the trough collector system further comprising a drive system that rotates the modules about the common axis of rotation, the drive system comprising an arm that is driven to rotate about the common axis of rotation, and that imparts torque to the first three dimensional structural lattice at one of the outer edges of the first module.

6. The trough collector system of claim 1, wherein the spanning member attaches to the first three-dimensional structural lattice a first distance from the first reflective surface and attaches to the second three-dimensional structural lattice a second distance from the second reflective surface, and wherein the first and second distances are different.

7. The trough collector system of claim 1, wherein the torque transfer connection enables adjustment of the rotational alignment of the first and second modules after the spanning member is attached to the first three-dimensional structural lattice and the second three-dimensional structural lattice.

8. The trough collector system of claim 7, wherein the spanning member attaches to at least one of the first and second modules using a slidable mechanism that can be fixed in place to lock the rotational alignment of the first and second modules.

9. A method of assembling a solar collector assembly, the method comprising:
    placing a first module on first and second pylons, the first module comprising a first reflector having a first reflective front surface shaped to concentrate incoming radiation on a linear tube, and a first three-dimensional structural lattice attached to the first reflector opposite the first reflective front surface; and
    placing a second module on the second and a third pylon, the second module comprising a second reflector having a second reflective front surface shaped to concentrate incoming radiation on the linear tube, and a second three-dimensional structural lattice attached to the second reflector opposite the second reflective front surface;
    wherein the first and second modules are constrained to rotate about a common axis of rotation substantially parallel to the linear tube, and the method further comprises
    attaching a spanning member to the first three-dimensional structural lattice; and
    attaching the spanning member to the second three-dimensional structural lattice;
    wherein the spanning member is not parallel to the axis of rotation.

10. The method of claim 9, wherein the spanning member is a first spanning member, the method further comprising:
    attaching a second spanning member to the first three-dimensional structural lattice; and
    attaching the second spanning member to the second three-dimensional structural lattice;
    wherein the second spanning member is not parallel to the axis of rotation.

11. The method of claim 9, wherein:
    attaching a spanning member to the first three-dimensional structural lattice comprises attaching the spanning member to the first three-dimensional structural lattice a first distance from the first reflective surface;
    attaching the spanning member to the second three-dimensional structural lattice comprises attaching the spanning member to the second three-dimensional structural lattice a second distance from the second reflective surface; and
    the first and second distances are different.

12. The method of claim 9, further comprising adjusting the rotational alignment of the first and second modules after attaching the spanning member to the first three-dimensional structural lattice and the second three-dimensional structural lattice.

13. The method of claim 12, wherein adjusting the rotational alignment of the first and second modules comprises:
    adjusting a slidable mechanism at the connection of the spanning member to at least one of the first and second modules; and
    fixing the slidable mechanism in place to lock the rotational alignment of the first and second modules.

* * * * *